United States Patent [19]
Sauvanet

[11] 3,982,175
[45] Sept. 21, 1976

[54] POWER REGULATING DEVICE

[75] Inventor: Maurice Sauvanet, Fontenay-le-Fleury, France

[73] Assignee: Silec-Semi-Conducteurs, Paris, France

[22] Filed: Sept. 25, 1974

[21] Appl. No.: 509,162

[30] Foreign Application Priority Data
Sept. 26, 1973 France ............... 73.34562

[52] U.S. Cl. .............. 323/18; 323/22 SC; 323/24
[51] Int. Cl.² ........................ G05F 5/00
[58] Field of Search ......... 307/252 UA; 323/22 SC, 323/24, 16, 18, 19

[56] References Cited
UNITED STATES PATENTS

| | | |
|---|---|---|
| 3,579,096 | 5/1971 | Buchanan ................. 323/24 X |
| 3,648,075 | 3/1972 | Mankovitz ................. 307/252 UA |
| 3,758,793 | 9/1973 | Pascente ................... 307/252 UA |
| 3,848,158 | 11/1974 | Dumas ..................... 307/252 UA |

Primary Examiner—A. D. Pellinen
Attorney, Agent, or Firm—Sughrue, Rothwell, Mion, Zinn and Macpeak

[57] ABSTRACT

A power regulating device operating by suppressing full half cycles of power applied to a load from an alternating voltage source. The device includes a controllable semiconductor element of the type which is triggered by removal of current from its control electrode. The anode and the cathode of the controllable semiconductor element are connected across the terminals of a rectified alternating voltage source, and the control electrode receives a fraction of the rectified voltage through an RC circuit and a two terminal threshold device.

11 Claims, 5 Drawing Figures

POWER REGULATING DEVICE

BACKGROUND OF THE INVENTION

1. Field of the Invention

The present invention relates to a process and a device for regulating the power applied to a load from a rectified alternating voltage source by suppressing p half cycles every n half cycles.

2. Description of the Prior Art

A known process for varying the average power applied to a load from an alternating network consists in interrupting the load circuit periodically. This process has been implemented in the prior art by progressively charging a capacitor connected between the gate and the cathode of a thyristor by way of a variable resistor with a rectified alternating voltage. The voltage at the terminals of the capacitor thus increases with each half cycle of the supply voltage. When it reaches a predetermined threshold value the charge on the capacitor is transferred to the control terminal of the thyristor which immediately closes the load circuit or which causes a main interrupter to open. In the case of this type of prior art device, to obtain passage of a full half cycle and reduce disturbances produced by the rapid closing of the interrupter, the latter must comprise a zero voltage control device which inhibits its conductivity at all times other than when the mains voltage (or rather the voltage at its terminals) has a very low absolute value. Inhibiting circuits or circuits triggering at zero are generally relatively complicated.

SUMMARY OF THE INVENTION

Accordingly, an object of the present invention is to provide an interrupter which is such that it is automatically controlled in the proximity of zero voltage without it being necessary to provide it with an inhibiting circuit.

To attain this object, the present invention provides a circuit comprising a controllable semiconductor element which is put into the conducting state by the removal of current on its control terminal. This interrupting device is connected to the terminals of a rectified alternating voltage source and its control terminal receives a fraction of the rectified voltage through an RC circuit and a two terminal threshold device.

Other objects, features and advantages of the present invention will be described in detail in the following description provided with reference to the accompanying drawings.

DESCRIPTION OF THE PREFERRED EMBODIMENTS

Figure 1:
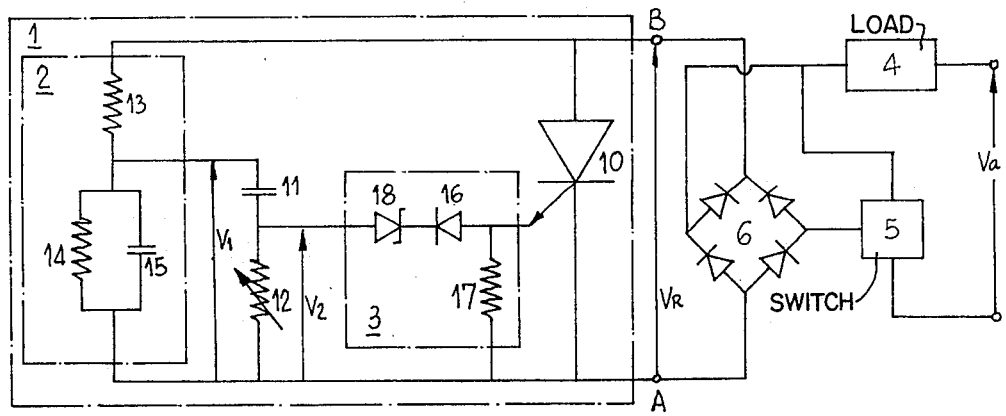
FIG. 1 shows a first embodiment of a device for suppressing half cycles according to the present invention.

With reference to FIG. 1, a device for regulating power by periodically suppressing half cycles according to the present invention comprises a semi-conductor means 10 adapted to be triggered by the sinking of current from its control terminal consisting, for example, of a junction gate thyristor, the main electrodes of which are connected to the terminals B and A to which is applied a rectified alternating voltage $V_R$. Disposed in parallel with the main electrodes of the junction gate thyristor 10 is a phase converter 2 of which the dephased output — the voltage $V_1$ — is connected to the terminal A through the series connection of a capacitor 11 and a resistor 12. The junction point between this capacitor 11 and the resistor 12 is connected to the gate of the thyristor 10 through a threshold device 3.

Figure 2:
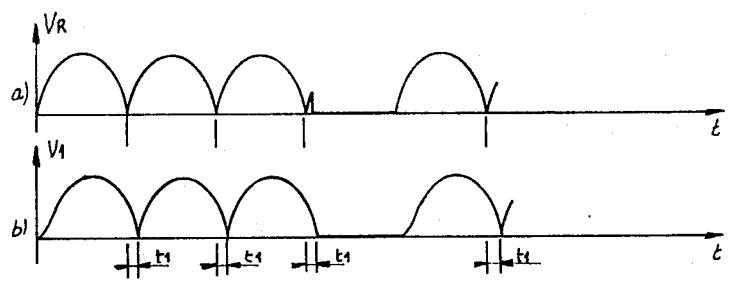
FIG. 2 provides diagrams of the voltage as a function of time to show the action of the device represented in FIG. 1.
Figure 2:
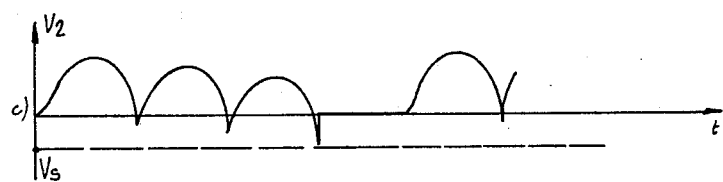

FIG. 2 represents diagrammatically the wave form of the voltages as a function of time at different points in the circuit shown in FIG. 1.

FIG. 2a represents the rectified alternating voltage $V_R$ between the terminals B and A. FIG. 2b shows the voltage $V_1$ at the output of the phase converter 2. FIG. 2c represents the voltage $V_2$ at the terminals of the resistor 12. All these voltages are referenced with respect to point A of the circuit. The voltage $V_2$ has an average value which decreases in proportion to the charging of the capacitor 11 by way of the resistor 12 (this average value approaches zero when the capacitor 11 has been completely charged). The lower points of the voltage $V_2$ which correspond to the passages to zero of the voltage $V_R$ descend increasingly negatively until one of these negative points reaches the threshold voltage $V_S$. When $V_2$ reaches the negative value $V_s$, the junction gate thyristor 10 is rendered conducting by the discharging of the capacitor 11 by way of the threshold device 3. This lowers the voltage between the terminals B and A and discharges the capacitor 11 which enables a new cycle to begin.

The thyristor 10 is rendered conducting for one-half cycle, provided that this conducting state is maintained long enough for the load current to reach a sufficient value (holding current). The phase converter 2 is provided to ensure that the thyristor continues to be conducting. The voltage $V_1$ is dephased with respect to the voltage $V_R$ and there is a delay $t_1$ so that the negative points of the voltage $V_2$ occur slightly after the passages to zero of the rectified voltage $V_R$.

Referring once again to FIG. 1, an embodiment of the present invention which is generally represented by the reference 1 will now be described in more detail. The phase converter 2 may consist of a resistor 13 of smaller value than resistor 12 serially connected with a resistor 14 and a capacitor 15 connected in parallel. The output of this phase converter is intercepted at the junction point of the resistor 13 with the resistor 14 and the capacitor 15. The threshold device 3 may consist solely of a diode 16 and a resistor 17 connected between the gate and the terminal A, but this threshold device may also comprise a Zener diode 18. It will be obvious to the person skilled in the art that different types of phase converting devices may be employed as well as other types of threshold devices which may consist, for example, of a trigger or a diac. In addition, the semi-conductor means 10 may be a triac used as a uni-directional interrupter as shown, for example, in FIG. 3.

Up to this point in the text a power regulator operating by suppression of $n-1$ half cycles every n half cycles and being connected to a rectified voltage sourcee $V_R$ has been described. In practice, power regulators operating by suppression of half cycles are generally used in association with an alternating voltage source. In this case, the terminals A and B are connected to a diagonal of a rectifier bridge 6, the other diagonal of which is connected to the control terminals of a controlled bi-directional interrupter 5 such as a triac, the main terminals of which are connected in series with a load 4 to a source of alternating voltage $V_a$. In this case, the main bi-directional interrupter 5 is rendered conducting when the rectifier bridge 6 operable over a whole cycle is in the conducting state, that is, when the above-described semi-conductor means 10 is conducting.

Figure 3:
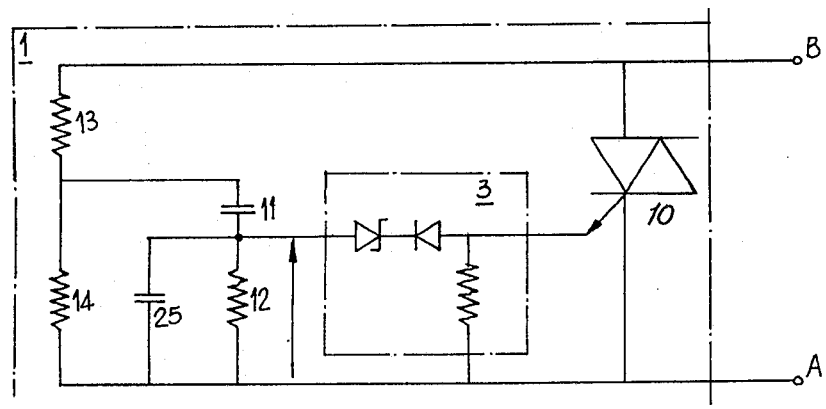
FIG. 3 shows another embodiment of the present invention.

FIG. 3 represents another embodiment of the present invention in which the phase converter and the circuit comprising the capacitor 11 and the resistor 12 do not constitute two clearly separate circuits. The elements 11, 12, 13, and 14 which are represented in this FIG. 3 correspond to elements bearing identical references in FIG. 1, but the capacitor 15 of FIG. 1 has been replaced by a capacitor 25 disposed in parallel with the resistor 12. In this variant, the delay $t_1$ is provided by the combination of the capacitors 11 and 25 which are arranged in series. The voltage at the terminals of the resistor 12 is divided by the ratio of the value of the capacitor 25 to the sum of the values of the capacitors 11 and 25. Consequently, the threshold device 3 and the capacitor 25 bear a lower maximum voltage than the device 3 and the capacitor 15 described with reference to FIG. 1.

Numerous other variants of the device 1 according to the present invention represented in FIGS. 1 and 3 may be produced. In particular, the semi-conductor means 10 may be inhibited or rendered conducting by an auxiliary circuit. The resistor 12 may be replaced by a current generator activated by a regulating voltage and the semi-conductor means 10 may be an element other than a junction gate thyristor, for example, a triac.

The circuit described above makes it possible to connect the load 4 to the voltage supply source for one-half cycle every $n$ half cycles. The number $n-1$ of the half cycles removed is determined by the time $t$ required for a lower point of the voltage $V_2$ to descend to the negative value $V_s$. This time depends on the value of the voltage applied to the capacitor 11, on the charging time constant of this capacitor and on the value of the threshold voltage $V_s$. The number $n$ —to 1 of half cycles which are eliminated and consequently the reduction in the average power applied to the load may be regulated by acting on one of these three parameters. For example, it would be possible to regulate the power by varying the threshold $V_s$, the ratio of the resistive divider bridge constituted by the resistors 13 and 14 or the value of the resistor 12 as illustrated, for example, in FIG. 1. The resistor 12 could also be replaced by a regulable current generator or it could be disposed in series with a variable voltage source.

An important application of a power regulating device operating by the suppression of half cycles as described above is supplying a load designed to operate on an effective voltage of $V_{inf}$, for example, 127 volts with an effective voltage $V_{sup}$ of, for example, 220 volts, $V_{sup}$ being greater than $V_{inf}$. As the ratio of the corresponding powers is 3, in the case of 220 volts and 127 volts, that is, $V^2_{sup}/V^2_{inf}$, it will be necessary to regulate the values of the parameters cited above so as to remove 2 out of 3 half cycles. With this type of regulation, if the value of the resistor 12 has increased, the power supplied to the load 4 will have decreased with respect to the nominal power. Thus, by supplying a load designated to operate on 127 volts with 220 volts, it is possible to vary the power progressively with respect to the nominal value in successive ratios of 1 (one-half cycle out of 3), of ¾ (one-half cycle out of 4), . . . of $3/n$ (one-half cycle out of $n$), by connecting a resistance or variable voltage in series with the resistor 12.

The power regulating device described above enables a network source of $V_{sup}$ voltage to be connected to a load 4 designed to operate on a lower voltage $V_{inf}$, thereby enabling, for example, a load designed to operate on 127 or 220 volts to be connected to mains of 220 or 380 volts. In practice, it may be advisable to permanently connect to the load designed to operate on a $V_{inf}$ voltage a circuit which is such that all the power is applied when the load is connected to a network source of $V_{inf}$ voltage and only a portion of this power in the ratio of $V^2_{inf}/V^2_{sup}$ is applied to the load when the load is connected to the $V_{sup}$ voltage mains. An automatic bi-voltage power regulating device of this type which operates only when the mains at the voltage $V_{sup}$, may be obtained by means of a device 1 according to the present invention in which the semi-conductor means 10 is rendered permanently conducting when the mains voltage is lower than a predetermined value $V_d$ situated between $V_{sup}$ and $V_{inf}$. To achieve this aim, the invention proposes either to raise the potential of the cathode of the means 10 or to apply a negative voltage to the gate of the means 10 when the supply voltage $V_a$ is lower than the value $V_d$.

Figure 4:
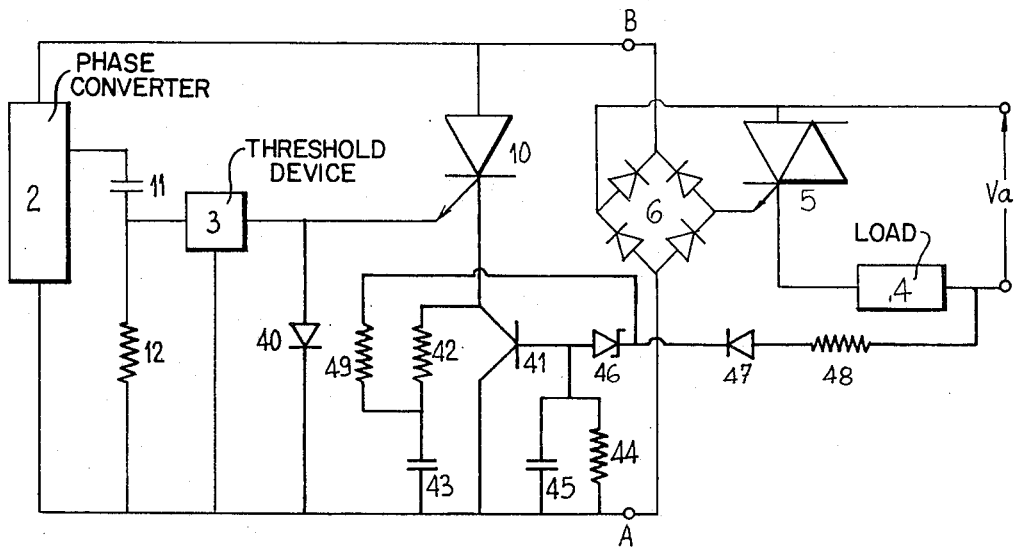
FIG. 4 represents a bi-voltage power regulator employing a device according to the present invention.

In reference to FIG. 4, an application will now be described in which the voltage of the cathode of the thyristor 10 is raised when the voltage $V_a$ is lower than a predetermined value $V_d$ situated between $V_{sup}$ and $V_{inf}$. In FIG. 4, the reference numerals 2, 3, 4, 5, 6, 10, 11 and 12 represent the parts of the assembly which have already been described and the reference numerals 40 to 49, new elements. The cathode of the means 10 is connected to the terminal A through the collector-emitter connection of a transistor 41. The collector of this transistor 41 is connected to the terminal A through a resistor 42 and a capacitor 43 its base being connected to the terminal A through the parallel circuit consisting of a resistor 44 and a capacitor 45. The base of the transistor 41 is also connected to the reference terminal of the voltage $V_a$ through a Zener diode 46, a diode 47 and the resistor 48. The junction point between the Zener diode 46 and the diode 47 is connected to the junction point of the resistor 42 and the capacitor 43 through a resistor 49. Thus the transistor 41 is rendered conducting by the Zener diode 46 when the voltage $V_a$ is greater than $V_d$. When $V_a$ is lower than $V_d$, the transistor 41 is blocked. The voltage which is a half cycle rectified by the diode 47 and the capacitor 43 through the resistors 48 and 49 produces permanent circulation of a current (being closed across the diode 40) into the junction gate means 10 which keeps this element 10 in a permanent state of conduction. The resistor 42 and the capacitor 43 temporarily prevent the conduction of the means 10 for a few half cycles during connection to a $V_{sup}$ voltage circuit.

Figure 5:
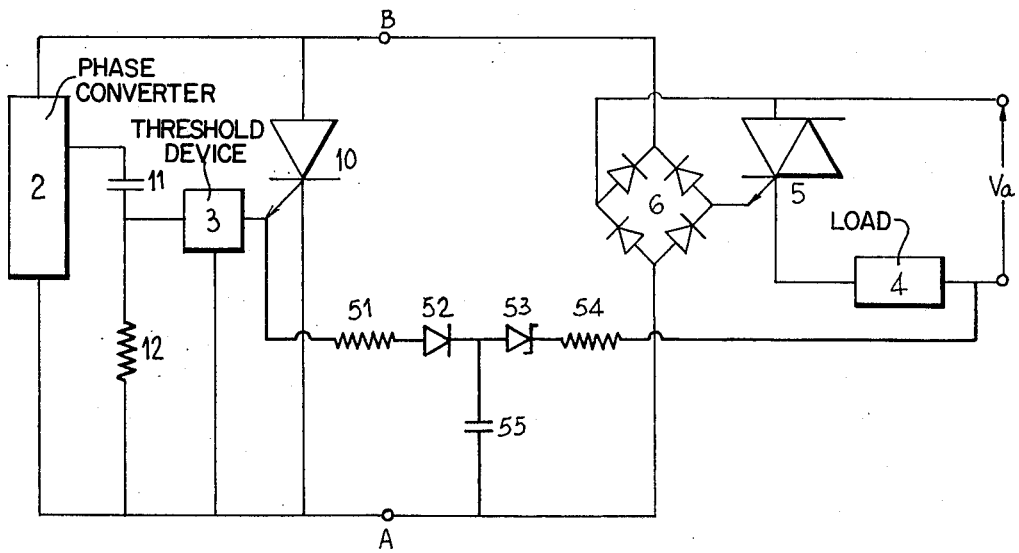
FIG. 5 represents another bi-voltage power regulator employing a device according to the present invention.

The application of a circuit in which a negative voltage is applied to the gate of the means 10 when a voltage $V_a$ is lower than a given value $V_d$ will now be described in reference to FIG. 5. As in the case of FIG. 4, the elements in the circuit shown in FIG. 5, have already been described in reference to FIGS. 1 and 3, are represented by like reference numbers while the new elements are represented by reference numerals 51 to 55. The circuit for applying voltage on the gate of the means 10 comprises a resistor 51, a diode 52, a Zener diode 53, a series resistor 54 connected between the gate of the means 10 and the reference terminal of the voltage $V_a$. A capacitor 55 is connected between the connection point of the diode 52 and the Zener diode 53 and the terminal A. During the application of the voltage, the means 10 is not conducting. There is no possible path for a current across the capacitor 55 which is thus not charged. After a period of two half cycles (in the case of a 220/127 volt conversion) of $V_a$, the means 10 is rendered conducting as was described in reference to FIG. 1. When the means 10 becomes conducting and cuts in for a negative half cycle (the upper terminal of the interrupter 5— which would be the anode $A_2$ in the case of a triac — being taken as reference), it permits circulation across a resistor 54 and the Zener diode 53 of a current which negatively charges the capacitor 55. The junction point of the elements 52, 53 and 55 becomes negative with respect to the point A. If the voltage $V_a$ is lower than $V_d$ (for example, 127 volts), this load continues to be applied and the average voltage on the capacitor 55 reaches a sufficiently high value to maintain a gate current across the resistor 51 and the diode 52, thereby ensuring that the means 10 remains permanently in the conducting state. However, if the supply voltage $V_a$ is greater than $V_d$ (for example, 220 volts), the diode 53 will operate as a diode during positive half cycles which discharges the capacitor 55 and keeps the voltage at its terminals at a low value. In the second case, the conduction of the means 10 is thus not influenced by the circuit comprising the elements 51, 52, 53, 54, and 55 and it occurs for one-half cycle out of three (always when there is 220 volt/127 volt conversion).

The present invention is not limited to the embodiments which have been described and other variants and modifications may be provided without departing from the scope of the invention.

What is claimed is:

1. A power regulating device operating by suppressing periodically full half cycles of power applied to a load from an alternating voltage source comprising:
   means connected to said alternating voltage source for producing a rectified voltage across first and second terminals,
   a controllable semiconductor element including an anode, a cathode and a control electrode of the type which is triggered by the current sinking from its control electrode, said anode and cathode being connected to said first and second terminals, respectively,
   an RC circuit comprising at least a resistor and a capacitor connected in series, said capacitor being connected to be charged from said first terminal and said resistor being connected to said second terminal, and
   a two electrode threshold device connected between said control electrode and the junction of said resistor and said capacitor, whereby the controllable semi-conductor element is periodically conducting for one-half-cycles of the alternating voltage source.

2. A power regulating device as recited in claim 1 further comprising phase converter means connected across said first and second terminals for producing a predetermined phase delay in said rectified voltage, said capacitor being connected to said first terminal through said phase converter means.

3. A power regulating device as recited in claim 2 wherein said RC circuit is part of said phase converter means.

4. A power regulating device as recited in claim 1 wherein said semiconductor element is a junction gate thyristor.

5. A power regulating device as recited in claim 1 wherein said semiconductor element is a triac.

6. A power regulating device as recited in claim 1 wherein said means for producing a rectified voltage is a diode rectifier bridge one diagonal of which is connected to said first and second terminals, said device further comprising a bi-directional switching means having first and second main electrodes and a control electrode, said first and second main electrodes being connected in series with a load and said alternating voltage source, the other diagonal of said bridge being connected between said bi-directional switching means control electrode and one of said first and second main electrodes.

7. A power regulating device as recited in claim 6 wherein said bi-directional switching means is a triac.

8. A power regulating device as recited in claim 6 further comprising means connected to said cathode and responsive to the voltage across said load for raising the potential of said cathode when the load voltage is lower than a predetermined voltage, whereby said semiconductor element is continuously conducting when the load voltage is lower than said predetermined voltage to transmit all available power to said load.

9. A power regulating device as recited in claim 6 further comprising means connected to said control electrode of said semiconductor element and responsive to the voltage across said load for removing current from said control electrode when the load voltage is lower than a predetermined voltage, whereby said semiconductor element is continuously conducting when the load voltage is lower than said predetermined voltage to transmit all available power to said load.

10. A power regulating device as recited in claim 1 wherein said resistor is variable.

11. A power regulating device as recited in claim 1 wherein said two electrode threshold device includes a zener diode.

* * * * *